July 26, 1927.

R. P. JACQUES 1,637,325

CONNECTER FOR LUBRICATING APPARATUS

Filed April 13, 1922

Inventor
Raynaldo P. Jacques
By Attorneys
Southgate & Southgate

Patented July 26, 1927.

1,637,325

UNITED STATES PATENT OFFICE.

RAYNALDO P. JACQUES, OF WOONSOCKET, RHODE ISLAND, ASSIGNOR, BY MESNE ASSIGNMENTS, TO THE BASSICK MANUFACTURING COMPANY, OF CHICAGO, ILLINOIS, A CORPORATION OF DELAWARE.

CONNECTER FOR LUBRICATING APPARATUS.

Application filed April 13, 1922. Serial No. 552,395.

This invention relates to a lubricating system for detachably connecting pipes or tubes or other conveying elements through which grease, oil or other liquid or semi-liquid lubricating material is forced under substantial pressure. These conveying elements may form parts of the lubricating system of an automobile or other automotive machine and the device is particularly designed for such automotive use but is also capable of more general application.

It is the object of my invention to provide such a connecter which is simple in construction, reliable and effective in operation, and which will not require accurate fitting or adjustment of the connected parts in order to give satisfactory results in use.

With this general object in view, an important feature of my invention relates to the provision of a nozzle or connecter having an outer end in which is mounted a packing preferably of leather or other relatively soft material, having an opening fitting the end of the nipple or other part to which the device is applied.

A further feature of my invention relates to the provision of means for utilizing the pressure of the grease or other lubricant to force the packing against the relatively smooth peripheral surface of the nipple, thus compressing it upon the nipple and preventing leakage between the parts.

My invention further relates to arrangements and combination of parts to be hereinafter described and more particularly pointed out in the appended claims.

Figure 1:
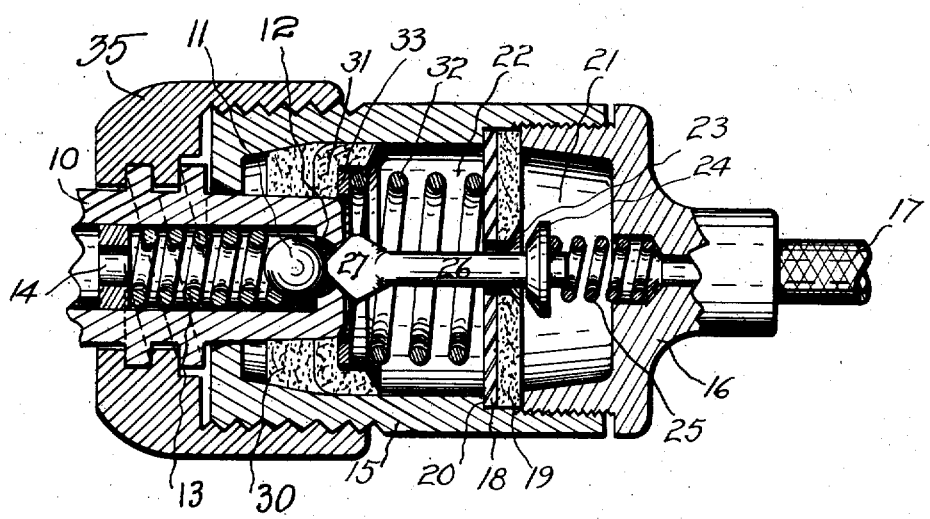
Figure 2:
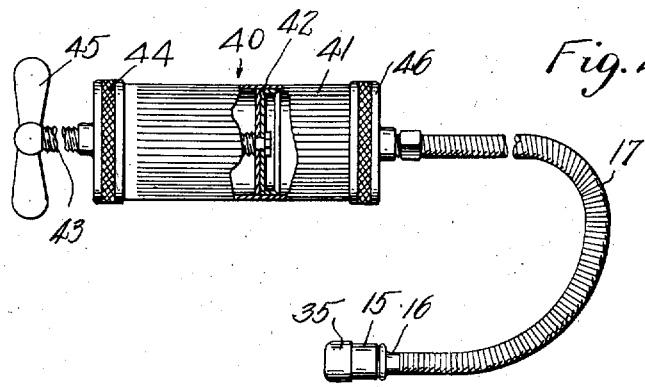

A preferred form of the invention is shown in the drawing in which Figure 1 is a sectional side elevation of my improved connecter, and Figure 2 is a broken plan view of a compressor with which the connecter of my invention is used.

Referring to the drawing, I have shown a lubricant receptacle or nipple 10 designed to be permanently secured to a bearing of an automobile or other machine. A ball valve 11 closes a valve port 12 in the end of the nipple and is yieldingly seated in the port by a spring 13 disposed between the ball 11 and a collar 14 forced within the nipple 10. The outer surface of the nipple is preferably formed with a slight taper to facilitate engagement and disengagement of the parts.

My improved connecter in the form shown comprises a sleeve or casing 15 threaded on a head 16 to the end of which a flexible hose 17 may be permanently secured by solder or other convenient means. The hose may be omitted and the connecter attached directly to a grease pump or other device for supplying lubricant under pressure. A disc 18 and leather washer 19 are secured between a shoulder 20 on the inside of the casing 15 and the inner end of the head 16. These parts 18 and 19 form a wall separating the interior of the connecter into two recesses or chambers 21 and 22.

An opening 23 is formed in the parts 18 and 19 and a valve 24 is normally seated therein by a valve spring 25. The valve stem 26 projects outward from the valve 24 and its flattened end 27 is adapted to engage the ball 11 and the end of the nipple 10, when the connecter is applied to a nipple. Such engagement forces open the valves 11 and 24 and permits flow of grease or other lubricant under pressure through the chamber 22 and into the nipple 10.

The outer end of the casing 15 has a conical bore and is provided with a packing 30 having an opening fitting the nipple 10. A cup washer 31 is slidable in the casing 15 and engages the packing 30, which packing, when the parts are connected, bears against and provides a tight seal with the smooth peripheral surface of the nipple 10. A spring 32 is disposed between the disc 18 and a washer 33 seated against the cup washer 31.

In Figure 2 I have shown a compressor 40 which may be of any suitable design, such for example as illustrated. This compressor comprises a barrel 41 from which the lubricant may be expelled by a piston 42 carried by a screw threaded stem 43 which threads in a cap 44 secured to the end of the barrel. The handle 45 is fixed to the end of the stem. The hose 17 may be secured to the bottom 46 of the compressor by any suitable coupling means or the connecter 16 may be rigidly attached to the bottom 46.

When the connecter is applied to a nipple and lubricant is forced from any suitable compressor through the connecter, the pressure of the lubricant added to the initial pressure of the spring 32 forces the packing 30 firmly into the conical bore of the casing 15, compressing the packing and causing it to firmly engage both the outer surface of the nipple 10 and the conical wall of the casing 15. Leakage of lubricant and displacement of the connecter are thus prevented and any increase in pressure in the chamber 22 merely causes the parts to be still more firmly engaged.

To provide a temporary rigid connection between the lubricant receiving member or nipple 10 and the nozzle or connecter of my lubricating system, and to provide for ready coupling thereof notwithstanding the necessity of opening the valve against substantial pressure during the coupling operation, I have provided on the end of the casing 15 a cap or nut 35, interiorly threaded to receive corresponding threads on the nipple 10. Thus, as the nozzle is presented to the nipple, rotation thereof will cause the threads in the nut 35 to engage the threads on the nipple and draw the parts firmly together, forcing open the valve 24 against the pressure of the lubricant and advancing the relatively smooth cylindrical outer end of the nipple through the surrounding packing 30 with an even guided and relative rotary motion which contributes to the provision of a tight seal between the cylindrical surface of the nipple and the inner surface of the packing. The packing 30 will not turn relative to the nozzle casing 15 during the coupling operation, because such relative turning movement will be resisted by the spring 32 and also because the bearing of the outer surface of the packing against the wall of the casing 15 is greater in area than the bearing thereof against the nipple 10.

The thread between the nipple and nozzle is preferably a coarse double thread of steep pitch. The thread between the nut 35 and the casing 15 is preferably, as illustrated, a relatively fine single thread of the same hand as the threads between the nipple and nozzle. The parts 15 and 35 may also be turned as a unit to connect the nozzle to the nipple, which procedure is especially desirable where the nozzle is directly carried by the lubricant-expelling gun or other lubricant container. I may however provide between the nut 35 and casing 15 a thread of the opposite hand from that between the nozzle and the nipple 10, so that when the nut 35 is turned relative to the casing 15 it will draw the casing 15 and nipple 10 toward one another, like a turnbuckle.

The cup leather 31 co-operates with the packing 30, forming in effect a single peripheral sealing member, the inner face of which contacts with the smooth peripheral surface of the nipple. The pressure of the lubricant, in the embodiment of my invention shown, acts to force this peripheral sealing member firmly against the smooth cylindrical surface of the nipple adjacent the lubricant-receiving end thereof.

Having thus described my invention, I do not wish to be limited to the details herein disclosed otherwise than as set forth in the claims, but what I do claim is:

1. A quick detachable connecter for lubricating apparatus, having, in combination, a nipple and a nozzle detachably secured thereon, said nozzle comprising a casing having a bore with a conical outer end, a packing ring in said conical end having an opening to receive said nipple, and means to move said packing ring axially outward in said conical end by pressure of the lubricant, thereby forcing the ring between said end and said nipple to seal the connection.

2. A connecter for lubricating apparatus having, in combination, a nipple and a nozzle detachably secured thereon, said nozzle comprising a casing having a bore with a conical outer end, a packing ring in said conical end having an opening to receive said nipple, and a cup washer slidable within said casing and engaging said packing ring, said washer being exposed to the full pressure of the lubricant and being thereby forced against said ring to press the same between said nipple and the conical wall of said casing to seal the connection.

3. A connecter for lubricating apparatus having, in combination, a nipple and a nozzle detachably secured thereon, said nozzle comprising a casing having a bore with a conical outer end, a packing ring in said conical end having an opening to receive said nipple, a cup washer slidable within said casing and engaging said packing ring, and a spring seating said washer against said packing ring, said washer being also exposed to the full force of the lubricant and being forced against said packing ring by the combined pressure of said spring and said lubricant.

4. In a lubricating apparatus, a nipple, a connecter comprising a casing, a wall therein having a central opening, a valve to close said opening, and a spring seating said valve, said valve having an outwardly projecting portion extending freely outward in said casing engaging the nipple to which said connecter is applied and being opened by engagement therewith, means including an inclined surface on said connecter and a co-operating part on said nipple effective to draw said connecter over said nipple by relative rotation of the two, and an annular packing in said nozzle rearwardly of said inclined surface surrounding the end of said nipple when the parts are connected, said packing being firmly pressed against the peripheral wall of the end portion of the nipple by the pressure of the lubricant in the nozzle.

5. A connecter for lubricating apparatus, having in combination, a nipple, a nozzle detachably secured thereto, and means to positively draw said parts together and form a rigid connection between said parts, said nozzle comprising a casing having a conical bore in its outer end portion, a packing ring therein fitting said nipple, means to move said packing ring axially outward to seal the connection to said nipple, and said connecting means comprising a cap threaded on both said nipple and casing but with unlike threads.

6. Lubricating apparatus of the class described including in combination, a lubricant receiving nipple, a lubricant discharge nozzle, a compressor for supplying lubricant to said nozzle under pressure, means including cooperating inclined surfaces on said nipple and nozzle, effective positively to draw said nipple and nozzle together, and an annular sealing member surrounding the end of said nipple when the parts are thus connected, said sealing member being forced firmly against the outer side wall of said inserted nipple by the pressure exerted thereon by the lubricant delivered to said nozzle by said compressor.

7. A connecter for lubricating apparatus, having in combination, a nipple having steep pitched threads on its exterior surface, a nozzle having corresponding internal threads by which said parts may be drawn together and rigidly but detachably connected, a spring seated valve in said nozzle engaged and forced open by said nipple when the latter is drawn into said nozzle, and an annular packing engaging the outer side wall of said nipple when thus positioned, said packing being forced into close contact with said nipple by the pressure of the lubricant in said nozzle thereon.

8. In a lubricator the combination of a lubricant receiving member presenting a relatively smooth peripheral surface adjacent the lubricant receiving end thereof, a lubricant delivery connection, a pressure retaining valve in said connection, means including an external thread on said lubricant receiving member and an internal thread on said connection cooperating between said connection and said receiving member whereby said connection may be attached to said member, and means cooperating between said valve and said receiving member whereby when said connection is attached to said receiving member said valve will be opened to permit the passage of lubricant into the receiving member, and a cup ring carried by the connection behind said internal thread to provide a seal for the joint between the said relatively smooth peripheral surface of said receiving member and the connection, said cup ring seating on said smooth peripheral surface prior to opening of the valve and sliding longitudinally of and turning relative to said smooth peripheral surface during the opening of said valve.

9. The combination with a lubricant receptacle presenting a relatively smooth peripheral surface adjacent the lubricant receiving end thereof, and a projecting coupling portion below said peripheral surface, of means for supplying lubricant thereto, comprising a compressor for exerting pressure upon the lubricant contained therein, said compressor having a coupling member for making a quickly detachable connection with said lubricant receptacle, said coupling member comprising a valve and means presenting a female inclined surface for engagement with said projecting coupling portion for successively connecting said coupling member with said lubricant receptacle, and opening said valve, or closing said valve and disconnecting said coupling member from said lubricant receptacle, said coupling member containing a cup ring for making a tight seal with said peripheral surface, said cup ring seating on said smooth peripheral surface prior to opening of said valve and sliding longitudinally over and turning relative to said peripheral surface during opening and closing of said valve.

10. In a lubricating system the combination with a first coupling member of a second coupling member comprising a sleeve for receiving said first coupling member, the said sleeve and first coupling member being provided with coacting means including a male thread carried by said first coupling member and a female thread carried by said second coupling member for forming a quickly detachable connection, a valve for said second coupling member, and means including an end of said first coupling member for co-acting with said sleeve for opening said valve after said sleeve has been connected with said first coupling member, said first coupling member providing a relatively long cylindrical portion between said male thread and said end, and said second coupling member providing a cup ring for making a tight seal against said cylindrical portion, said cup ring seating on said smooth peripheral surface prior to opening of the valve and sliding longitudinally over and turning relative to said peripheral surface during opening and closing of said valve.

11. The combination with a lubricant receptacle of a compressor for supplying lubricant thereto, comprising a coupling member, said lubricant receptacle and coupling member having coacting means for connecting said lubricant receptacle and coupling member upon an initial rotation of said coupling member relatively to said lubricant receptacle, a valve controlling the flow of lubricant from said compressor to said lubricant receptacle, and means for opening said valve upon continued rotation of said coupling member relatively to said lubricant receptacle, said lubricant receptacle presenting adjacent the lubricant receiving end thereof a relatively smooth cylindrical peripheral portion and said coupling member presenting a cup ring for making a tight seal with said peripheral surface, said cup ring seating on said smooth peripheral surface prior to opening of the valve and sliding longitudinally over and turning relative to said peripheral surface during opening and closing of said valve.

12. The combination with a lubricant receptacle of a compressor for supplying lubricant thereto, comprising a coupling member, coacting means on said lubricant receptacle and coupling member for connecting said lubricant receptacle and coupling member upon initial rotative movement of said coupling member relatively to said lubricant receptacle, a valve for controlling the discharge of lubricant from said compressor, and means for opening said valve upon continued movement of said coupling member relatively to said lubricant receptacle, said lubricant receptacle presenting adjacent the lubricant receiving end thereof a relatively smooth cylindrical peripheral portion and said coupling member presenting a cup ring for making a tight seal with said peripheral surface, said cup ring sliding longitudinally over and turning relative to said peripheral surface during opening and closing of said valve.

13. In a lubricator the combination of a lubricant receiving member presenting a relatively smooth peripheral surface adjacent the lubricant receiving end thereof, a lubricant delivery connection, a pressure retaining valve in said connection, means including an external thread on said lubricant receiving member and an internal thread on said connection co-operating between said connection and said receiving member whereby said connection may be attached to said member, means co-operating between said valve and said receiving member whereby when said connection is attached to said receiving member said valve will be opened to permit the passage of lubricant into the receiving member, and a peripheral sealing member carried by the connection behind said internal thread to provide a seal for the joint between the said relatively smooth peripheral surface of said receiving member and the connection, said peripheral sealing member seating on said smooth peripheral surface prior to opening of the valve and sliding longitudinally of and turning relative to said smooth peripheral surface during the opening of said valve.

14. The combination with a lubricant receptacle presenting a relatively smooth peripheral surface adjacent the lubricant receiving end thereof and a projecting coupling portion below said peripheral surface, of means for supplying lubricant thereto, comprising a compressor for exerting pressure upon the lubricant contained therein, said compressor having a coupling member for making a quickly detachable connection with said lubricant receptacle, said coupling member comprising a valve and means presenting a female inclined surface for engagement with said projecting coupling portion for successively connecting said coupling member with said lubricant receptacle and opening said valve, or closing said valve and disconnecting said coupling member from said lubricant receptacle, said coupling member containing a peripheral sealing member for making a tight seal with said peripheral surface, said peripheral sealing member seating on said smooth peripheral surface prior to opening of said valve and sliding longitudinally over and turning relative to said peripheral surface during opening and closing of said valve.

15. In a lubricating system the combination with a first coupling member of a second coupling member comprising a sleeve for receiving said first coupling member, the said sleeve and first coupling member being provided with coacting means including a male thread carried by said first coupling member and a female thread carried by said second coupling member for forming a quickly detachable connection, a valve for said second coupling member, and means including an end of said first coupling member for co-acting with said sleeve for opening said valve after said sleeve has been connected with said first coupling member, said first coupling member providing a relatively long cylindrical portion between said male thread and said end, and said second coupling member providing a peripheral sealing member for making a tight seal against said cylindrical portion, said peripheral sealing member seating on said smooth peripheral surface prior to opening of the valve and sliding longitudinally over and turning relative to said peripheral surface during opening and closing of said valve.

16. The combination with a lubricant receptacle of a compressor for supplying lubricant thereto, comprising a coupling member, said lubricant receptacle and coupling member having coacting means for connecting said lubricant receptacle and coupling member upon an initial rotation of said coupling member relatively to said lubricant receptacle, a valve controlling the flow of lubricant from said compressor to said lubricant receptacle, and means for opening said valve upon continued rotation of said coupling member relatively to said lubricant receptacle, said lubricant receptacle presenting adjacent the lubricant receiving end thereof a relatively smooth cylindrical peripheral portion and said coupling member presenting a peripheral sealing member for making a tight seal with said peripheral surface, said peripheral sealing member seating on said smooth peripheral surface prior to opening of the valve and sliding longitudinally over and turning relative to said peripheral surface during opening and closing of said valve.

17. The combination with a lubricant receptacle of a compressor for supplying lubricant thereto, comprising a coupling member, co-acting means on said lubricant receptacle and coupling member for connecting said lubricant receptacle and coupling member upon initial rotative movement of said coupling member relatively to said lubricant receptacle, a valve for controlling the discharge of lubricant from said compressor, and means for opening said valve upon continued movement of said coupling member relatively to said lubricant receptacle, said lubricant receptacle presenting adjacent the lubricant receiving end thereof a relatively smooth cylindrical peripheral portion and said coupling member presenting a peripheral sealing member for making a tight seal with said peripheral surface, said peripheral sealing member sliding longitudinally over and turning relative to said peripheral surface during opening and closing of said valve.

18. A connecter for lubricating apparatus, having in combination, a nipple having steep pitched threads on its exterior surface, a nozzle having corresponding internal threads by which said parts may be drawn together and rigidly but detachably connected, a valve in said nozzle engaged and forced open by said nipple when the latter is drawn into said nozzle, and an annular packing engaging the outer side wall of said nipple when thus positioned, said packing being forced into close contact with said nipple by the pressure of the lubricant in said nozzle thereon.

19. A lubricant receiving nipple for quick detachable connection to a lubricant expelling device having, in combination, a body, a lubricant conducting bore through said body, a spring pressed inwardly opening check valve in said bore normally closing the outer end of said bore, said nipple having a generally cylindrical end portion of substantial length for engagement with a sealing member, and steep pitched screw threads rearwardly of said end portion for engagement with female threads on said lubricant expelling device, whereby said cylindrical portion of said nipple may be positively drawn into engagement with said sealing member.

20. In lubricating apparatus of the class described, the combination of a lubricant compressor, a lubricant discharge nozzle connected thereto, said nozzle having quick-detachable coupling means and sealing means, and a lubricant receiving nipple comprising a body having a lubricant conducting bore therethrough, a spring pressed inwardly opening valve in said bore normally preventing back flow of lubricant therethrough, said nipple having a generally cylindrical end portion of substantial length for engagement with said sealing means, and steep-pitched screw threads rearwardly of said end portion and adapted to engage said coupling means for positively drawing said cylindrical portion of said nipple into engagement with said sealing means.

In testimony whereof I have hereunto affixed my signature.

RAYNALDO P. JACQUES.